Aug. 13, 1929.　　J. BLACKBURN　　1,724,001
MONOLITHIC STEERING WHEEL FOR AUTOMOBILES
Filed Dec. 12, 1927　　2 Sheets-Sheet 1
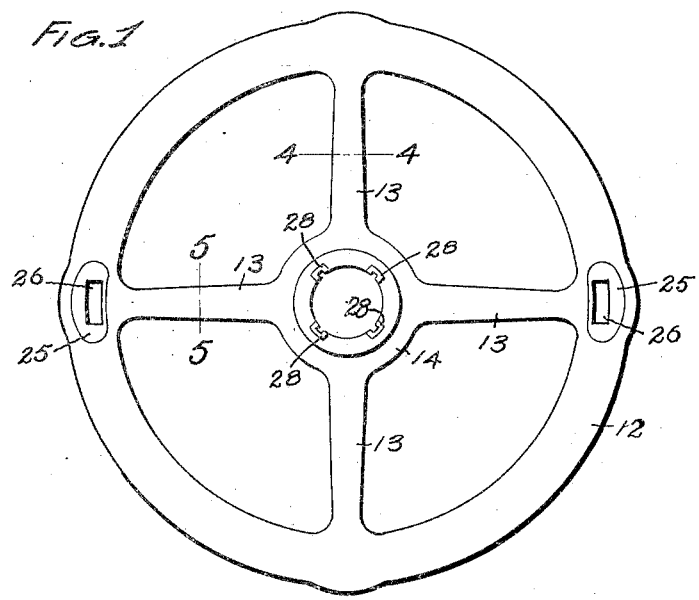
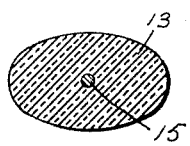
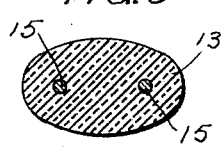
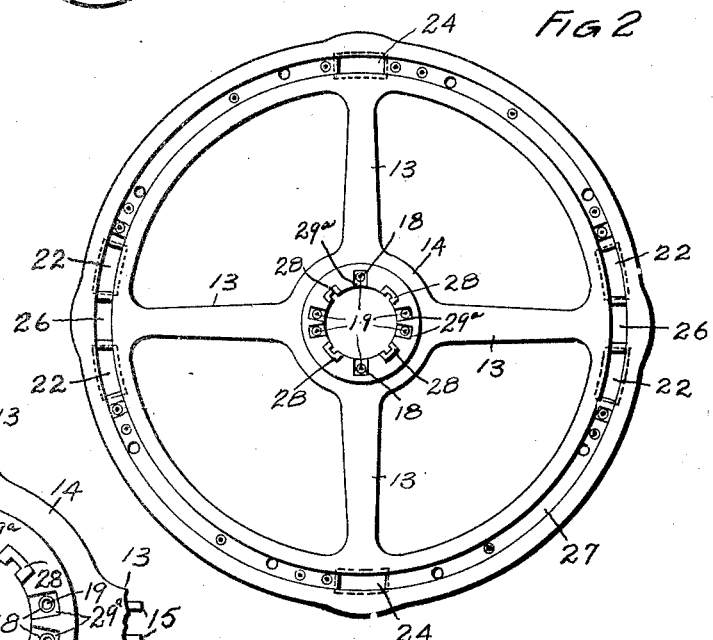
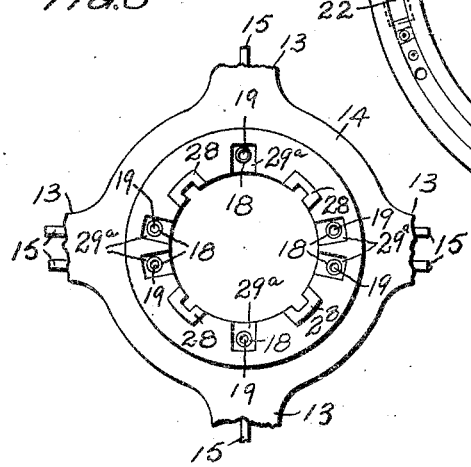
INVENTOR
JASPER BLACKBURN
By Edward E. Longan
ATTY.

Aug. 13, 1929.       J. BLACKBURN       1,724,001
MONOLITHIC STEERING WHEEL FOR AUTOMOBILES
Filed Dec. 12, 1927       2 Sheets-Sheet 2
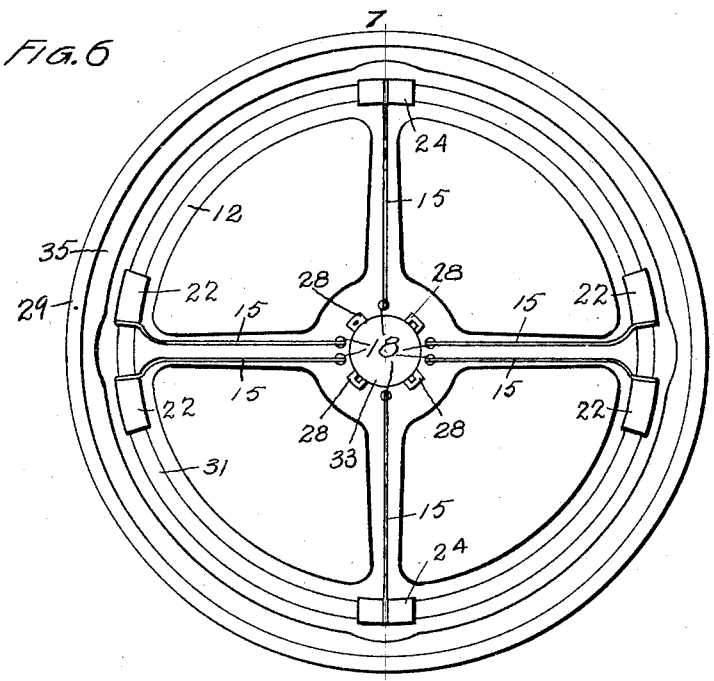
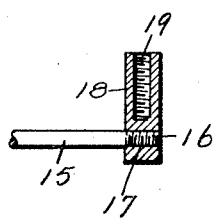
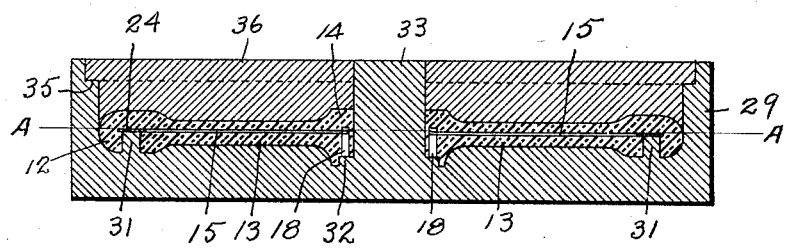
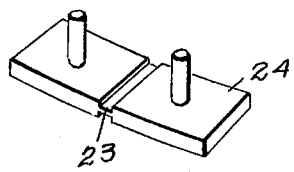
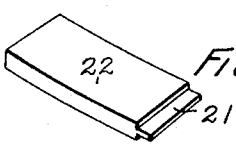
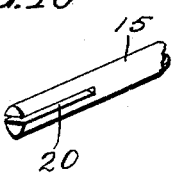
INVENTOR
JASPER BLACKBURN
BY Edward E. Lingan
ATTY.

Patented Aug. 13, 1929.

1,724,001

UNITED STATES PATENT OFFICE.

JASPER BLACKBURN, OF WEBSTER GROVES, MISSOURI.

MONOLITHIC STEERING WHEEL FOR AUTOMOBILES.

Application filed December 12, 1927. Serial No. 239,458.

My invention relates to improvements in monolithic steering wheels for automobiles and method of making the same, and has for its primary object a steering wheel for automobiles or motor vehicles, which is a monolithic structure, that is, in which the material comprising the hub, spokes and rim is formed as a unit of the same material.

A further object is to construct a steering wheel as aforedescribed in which electric conductors, terminals and contact plates are molded or secured in the wheel during its construction, the conductors, terminals and plates so molded serving as reinforcements for the wheel.

In illustrating my device I have eliminated the switches and various movable contacts necessary for the reason that they do not form part of my present construction, but are placed in position after the wheel has been made.

In the drawings:

Fig. 1 is a top plan view of my improved wheel when made;

Fig. 2 is a bottom plan view of the same;

Fig. 3 is an enlarged fragmental view of the hub showing the manner of locating the terminals therein;

Fig. 4 is an enlarged cross section of one of the spokes taken on the line 4—4 of Fig. 1;

Fig. 5 is a similar view taken on the line 5—5 of Fig. 1;

Fig. 6 is a plan view of the female portion of the mold with a portion of the material located therein showing the manner of placing the binding posts, conductors and contact plates prior to completing the wheel;

Fig. 7 is a cross section taken on the line 7—7 of Fig. 6 showing the male portion of the mold in position and after the material has been compressed;

Fig. 8 is an enlarged fragmental sectional view of one of the binding posts employed;

Fig. 9 is an enlarged perspective view of one of the terminal plates used for the battery and horn connections;

Fig. 10 is an enlarged perspective view of one of the terminal plates used for the ignition or light circuits; and Fig. 11 is an enlarged perspective view of the end of one of the reinforcing conductors which is attached to a terminal plate.

In the construction of my device I employ a wheel having a rim 12, which is provided with spokes 13. The spokes terminate in a hub 14, the rims, spokes and hub being formed of plastic material, such as phenol resins, or it may be formed of hard rubber or similar material, and which at the same time has a high dielectric and mechanical strength and which is capable of having a permanent finish and will also resist ordinary temperatures.

Extending through the spokes 13 are electric conductors 15, which are preferably in the form of copper bars although any electric conducting material may be used. These bars are of sufficient size to add materially to the strength of the spokes. The inner ends of the bars 15 are screw threaded as indicated by the numeral 16, which ends are secured in a screw threaded bore 17 formed diametrically through a binding post 18. Each binding post 18 is also provided with a longitudinally extending screw threaded bore 19 for the reception of binding screws so that electric conductors can be secured to these posts. The outer ends of the bars 15 are bifurcated or slotted as indicated by the numeral 20 (see Fig. 11) in which bifurcation the tongues 21 formed on the plates 22 or also the recessed portion 23 of the plates 24 are inserted. In this way the bars 15 can be secured to the plates without any danger of becoming loosened during the pressure to which the wheel is subjected during its finishing. Also by screw threading the bars 15 into the contacts 18 any danger of loosening at this point is eliminated because it is necessary when constructing my improved wheel to subject the material, out of which it is formed, to a very high pressure, and if the portions were merely soldered together, there may be a chance that this extreme pressure will separate or break the soldered joints and consequently disrupt the electric circuit.

The wheel rim 12 when formed has in its upper face and at diametrically oppositely disposed points recesses 25 and openings 26 through which certain portions of switches, not shown, project. The under face of the rim is provided with a circumferential groove 27, which extends entirely around the rim. Opposite the spokes are located the plates 22 and 24, these plates being of greater width than the groove 27 so that they will be firmly anchored in the material out of which the wheel is formed.

The hub 14 is also provided with bars 28 which are channeled and which serve the purpose of attaching the steering post of a motor vehicle so that when the wheel is turned the steering post will also be turned. The underside of the hub 14 is provided with recesses 29ª, the surface of which is flush with the binding posts 18, which permits electric conductors to be secured to the binding posts and without interfering with the lower surface of the hub 14.

It will be noted that two of the spokes 13 contain only a single conductor, these conductors leading to the conducting plates 24, one of which is designed to be connected to the battery circuit through a binding post and the other to a horn signal circuit. The plates 23, which are located to either side of the openings 26, are connected on one side of the wheel to the ignition and on the other side to the lighting system, or rather to the headlights so that the full headlight or dimmed headlight can be controlled from one side of the wheel, while the ignition, either a complete battery ignition or battery and magneto ignition, controlled from the other side without removing the hand from the wheel.

The channel 27 is designed to have a rim placed therein which, upon being pushed upward, will complete the circuit between the horn or other signal device and the battery.

These particular electric connections and their operations have been fully described by me in Patents Nos. 1,480,656, dated January 15th, 1924, 1,435,692 dated November 14th, 1922, 1,366,554 dated January 5th, 1921; and 1,447,751 dated March 3rd, 1926. I, therefore, deem it useless to go into a detailed description and illustration of how these switches and connections are made.

In preparing my wheel I use the female die 29, which is provided with a grooved portion forming a part of the rim. An upstanding flange 31 is formed integral with the die 29 to form the channel 20. The female die is also provided with upstanding portions 32, which form the recess 29ª and with a projection 33 which forms the bore or opening through the center of the hub. The female die is also provided with radiating recesses which form a portion of the spokes and with a shoulder 35, which limits the downward movement of the male die 36.

During the formation of my wheel I first take the female member 29 and fill it with the proper material to a level with the rim or projection 31, which will approximately complete one-half of the spoke. The material, it will be understood, is in either pulverized or granular form so that it can readily be placed in the mold. The electric conductors together with the terminal posts and plates are then placed in position on top of this material after which the mold is filled up approximately to the shoulder 35. Then, the male member 36 is placed thereon, the entire mold placed in a hydraulic press and simultaneously with the pressure being exerted the mold is subjected to heat. This heat softens or fluxes the material out of which the wheel is formed, causing it to completely fill the mold and, on account of the pressure during this fluxing, the material is compressed to approximately one-third of its original volume. Of course, prior to the filling of the mold, it is advisable to add wood flour, asbestos, or some other material, so as to further strengthen the plastic material out of which the wheel is formed. The pressure used is approximately two thousand (2,000) pounds per square inch on the surface to be molded, and the temperature employed about 360° F.

After the wheel has been subjected to this pressure and temperature for a certain length of time, the mold is removed and permitted to cool, after which it is opened and the article removed. Then, in the event of any fins or ribs projecting from the finished article along the joining edges of the mold, they are removed, either by buffing or grinding. In this way I achieve a monolithic or unitary structure which, while having electric conductors molded therein, also utilizes these electric conductors as a reinforcement and on account of the material out of which my wheel is made, it being dielectric, I can use much heavier rods or bars and can dispense entirely with any insulation.

It is to be understood, of course, that the material, out of which my improved wheel is formed, can be of any color so as to suit the taste of the individual user.

It is also water or moisture proof and will not lose its luster under handling, and furthermore will not become soft or lose its shape under ordinary temperatures.

It will also have practically the same rigidity and strength as steering wheels now in use, which use a metallic spider or spokes.

While I have shown my device with plates in the rim and binding posts in the hub, I do not desire to limit my structure thereto as the ends of the conductors imbedded in the spokes can be so constructed that switches in the rim will make contact with certain of said conductors for completing an electric circuit therethrough and the opposite ends of the conductors, which terminate in the hub arranged, to have conductors leading therefrom to a source of electrical energy and various translating devices.

In addition to making my wheel of plastic material, which is to be subjected to pressure and heat, I may also make it of a material requiring pressure. I may also make it of a material requiring only heat in order to complete the wheel, the essential feature of my device beginning the construction of a molded steering wheel of unitary or monolithic structure having electric conductors molded in the spokes, which conductors also serve as reinforcements for the spokes and which have their ends terminating in the rim and hub for the purposes aforementioned.

Having fully described my invention, what I claim is:—

1. A steering wheel comprising a rim, a hub, and a plurality of spokes all formed of plastic material, said rim having a circumferential groove formed in its underneath face, contact plates partially embedded in said groove adjacent the spokes, binding posts located in said hub adjacent the spokes, electric conductors for connecting said plates and binding posts, said conductors being imbedded in said spokes whereby the same are reinforced.

2. A steering wheel comprising a molded body having a rim, a hub, and a plurality of spokes integrally formed of plastic material, a circumferentially extending channel formed in the underneath face of said rim, contact plates molded in said rim adjacent the spokes and having a portion of one face exposed in the channel, binding posts molded in the hub adjacent said spokes, said binding posts being exposed on the underneath face of the hub, and relatively stiff electric conductors connecting said contact plates and binding posts molded in said spokes, said conductors also serving to reinforce the spokes.

3. In a new article of manufacture a molded steering wheel formed of plastic material and having electric conductors imbedded therein, said conductors having their ends exposed for the securing of translating devices thereto and the remainder thereof serving to reinforce the wheel.

4. In an article of manufacture a steering wheel having its rim, hub and spokes molded in a monolithic structure from plastic material, electric conductors molded in said spokes and simultaneously serving to reinforce the same, said conductors having their ends terminating in the rim and hub, the ends of said conductors being exposed so that electric connections with translating devices can be made therewith.

5. A steering wheel comprising a rim, a hub and spokes integrally formed of molded plastic material, said rim having a circumferential groove formed in its underneath face, electric conductors embedded in said spokes and terminating at their opposite ends in the rim and hub, said ends being arranged with means for contact with switches and connection with electric conductors whereby an electric circuit can be completed therethrough delivered to various translating devices.

In testimony whereof I have affixed my signature.

JASPER BLACKBURN.